United States Patent [19]
Braeger et al.

[11] Patent Number: 4,793,026
[45] Date of Patent: Dec. 27, 1988

[54] APPARATUS FOR REMOVING A SURFACE LAYER FROM ANIMAL MUSCULAR TISSUE, PARTICULARLY A LAYER INCLUDING THE SKIN FROM FISH FILLETS

[75] Inventors: Horst Braeger; Rainer Brocksch, both of Lübeck; Peter Groth, Ratzeburg, all of Fed. Rep. of Germany

[73] Assignee: Nordischer Maschinenbau Rud. Baader GmbH+ CO KG, Lubeck, Fed. Rep. of Germany

[21] Appl. No.: 15,975
[22] Filed: Feb. 18, 1987

[30] Foreign Application Priority Data

Feb. 20, 1986 [DE] Fed. Rep. of Germany ....... 3605414

[51] Int. Cl.[4] .............................................. A22C 25/17
[52] U.S. Cl. .......................................... 17/62; 17/21; 17/50
[58] Field of Search ................ 17/62, 21; 99/588, 589

[56] References Cited

U.S. PATENT DOCUMENTS

| | | | |
|---|---|---|---|
| 1,867,133 | 7/1932 | Bisset | 17/62 |
| 1,975,044 | 9/1934 | Kelly | 99/589 |
| 3,739,428 | 6/1973 | Bartels et al. | 17/62 |
| 4,292,710 | 10/1981 | Townsend | 17/21 |
| 4,649,604 | 3/1987 | Braeger | 17/21 X |

Primary Examiner—Willie G. Abercrombie
Attorney, Agent, or Firm—Thomas R. Morrison

[57] ABSTRACT

An apparatus for skinning fish includes a pressure pad carrying an oscillating knife blade and defining a presser surface which faces the circumferential surface of a skinning roller, the pressure pad being mounted to yield against spring force. The oscillating knife blade is guided in a pocket formed in the pressure pad. This arrangement makes it possible to skin fish fillets without any splitting of the tail portion.

16 Claims, 1 Drawing Sheet

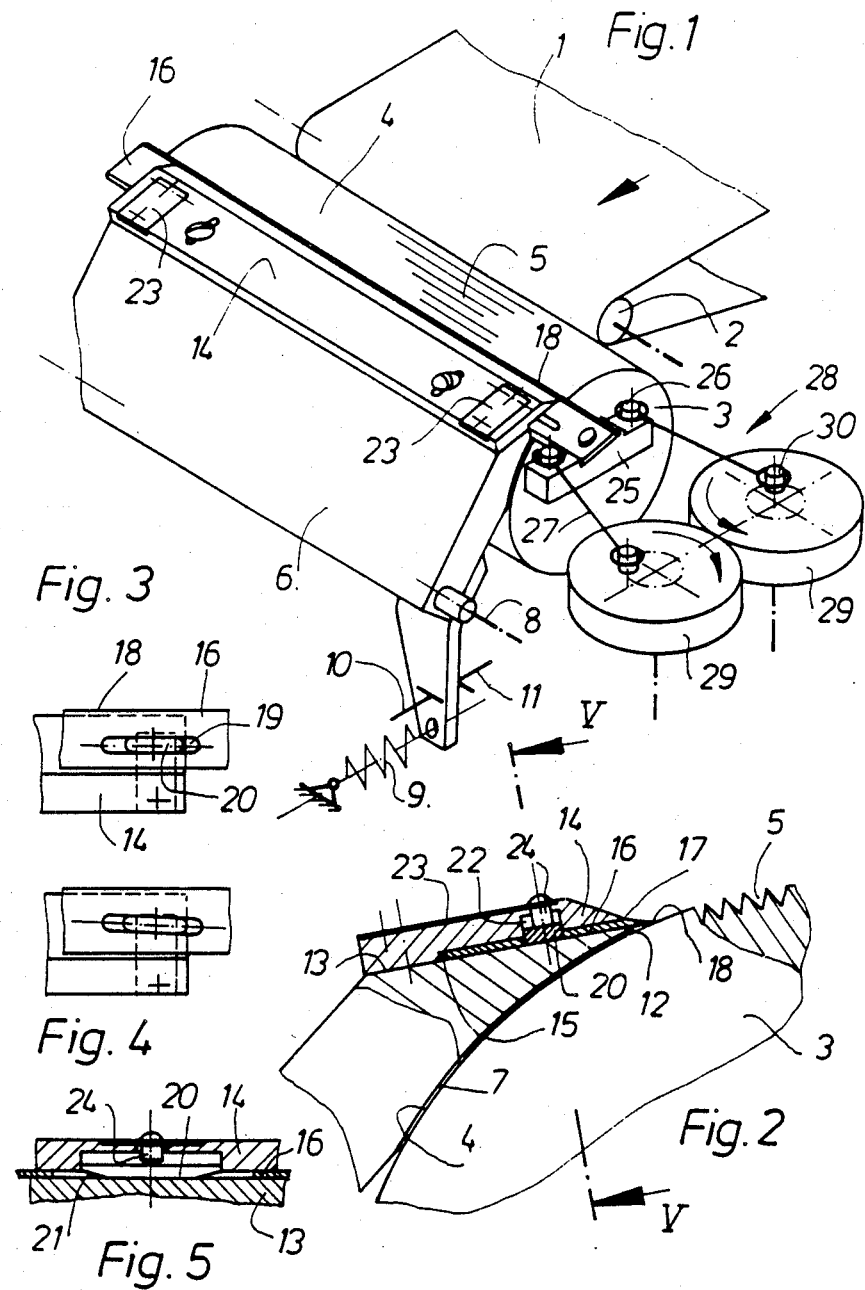

4,793,026

APPARATUS FOR REMOVING A SURFACE LAYER FROM ANIMAL MUSCULAR TISSUE, PARTICULARLY A LAYER INCLUDING THE SKIN FROM FISH FILLETS

BACKGROUND OF THE INVENTION

1. Field of the Invention

The invention relates to an apparatus for removing a surface layer from animal muscular tissue, particularly a skin-including layer from fish fillets, the apparatus comprising a skinning roller driven to rotate and having a circumferential surface designed to grip the material to be treated; a pressure pad provided with a presser surface facing the circumferential surface of the skinning roller, being mounted to be displaced resiliently relative to the circumferential surface of the skinning roller and including a knife receiving pocket; and a blade-like skinning knife received in the pocket.

2. Prior Art

Apparatuses showing these and similar structural features are widely used and are known from printed publications. For example, German Pat. No. 2 049 353 discloses an apparatus, whose structural features correspond to those described above. Use is made therein of a fixed knife blade inserted into the pressure pad, the presser surface being at a limited distance and equidistant from the skinning roller or the circumferential surface thereof and the cutting edge of the skinning knife extending at a distance from the circumferential surface of the skinning roller, which distance corresponds to the thickness of the layer to be severed.

However, as has been found, a satisfactory result could only be obtained when processing the fillets of round fish, this term being used to differentiate from flat fish. The problems encountered in processing fillets of the latter fish type are due to the fact that the skin of such fish is very intimately connected to the muscular substance by a plurality of sinews or similar tendinous ligaments. It was therefore unavoidable to use a drawing cut for processing such fish. In view of this finding and the attempts made to overcome the expensive and maintenance-costly principle of band knife skinners, developments have led towards a system which is characterized by a knife driven to oscillate, as is e.g. disclosed by German Pat. No. 680 720. In this system, the knife is enabled to move from a disengaged and spaced apart basic position into the (closer) working position after the initial portions of the fillet have moved past. Thus, initial fragments are lost and this has to be accepted principally as a production loss.

This deficiency was intended to be removed by the construction in accordance with German Pat. No. 18 10 673, in particular by the embodiment according to FIG. 2 thereof. This construction has an oscillating skinning knife, whose possibilities of pivoting are adjustable and limited in such a way that it remains with a fixedly set spacing with respect to the circumferential surface of the skinning roller. A pressure pad is located below the skinning knife and is at a fixed distance from the circumference of the skinning roller. When using this apparatus, particularly when processing flat fish fillets, a disadvantage arises which is due to the basic concept of this construction. This is revealed in that the tail area splits along the spinal line, so that the skinned fillet receives a dovetail-like appearance, which is considered to be so disadvantageous and an enormous handicap from the quality standpoint that this machine has not been accepted and adopted in this field. The reason for this splitting is the transverse stressing of the fillet during skinning due to the fact that the skinned fillet portions are forced against the oscillating back surface and are accelerated in accordance with the oscillating movement thereof. This effect is supported by that part of the lower surface of the knife which is exposed upstream of the presser surface, the wedge action and the cutting resistance causing an adequately intimate friction between the knife and the fillet, so that the oscillating movement is transferred onto the fillet. In order to reduce this effect by improving the grip of the skin on the skinning roller, the circumferential surface thereof has been provided with a diamond or right-angled knurling. However, apart from a hardly noticeable improvement to the aforementioned effect, this led to a reduction of the reliability of the cutting-start, because now the spacing of the presser surface from the circumferential surface of the skinning roller had to be set at least to the skin thickness of the fillet to be skinned, to ensure that the skin entered underneath the presser surface. However, the resulting gap reduces the pressing action with respect to the skinning roller necessary for a reliable conveying or feeding. In order to enable the necessary close positioning of the presser surface, the circumferential surfaces of the skinning rollers are therefore presently provided with longitudinal grooves, in which the fillet is engaged with its tail end and can thus enter underneath the pressure surface.

Tests carried out with an apparatus according to DE-OS 21 18 164 comprising an oscillating skinning knife which had a reduced moving distance as regards the moving into the working position by the fillet entering into the gap between the skinning roller and the pressure pad also failed to solve the above problem, so that this concept has also not become commercially successful. Apart from the stressing of the fillets as a result of the oscillation, this apparatus led to an above-average unreliability in the initiation stages of the cutting. This is in accordance with the expectations from the aforementioned findings and is mainly due to the fact that the presser surface in its basic position gives the incoming fillet a greater distance from the circumferential surface of the skinning roller than in the working position. Thus, a movement of the pressure pad into the working position only takes place coincidentally, i.e. purely by chance, because for this movement it is necessary that the fillet be adequately entrained by the skinning roller. However, even when the fillet arrives at the knife cutting edge, this entrainment only takes place through friction and pushing engagement of the circumferential surface of the skinning roller roughened by (diamond) knurling or the like. However, this manner of conveying is generally not sufficient to enable the knife to achieve a cutting depth enabling the separated layer to reach the clamping point between the presser surface and the circumferential surface of the skinning roller. However, this is a prerequisite for an adequate torque to become effective on the intermediate gear, in order to bring the knife into the working position close to the circumference and to cause the positive conveying which enables the actual skinning process.

OBJECTS OF THE INVENTION

It is therefore the major object of the present invention to suggest a skinning apparatus enabling both flat and round fish to be skinned in a completely satisfactory manner, i.e. without the above-described problems. It is a further important object of the present invention to perform such skinning whilst obtaining an excellent quality.

SUMMARY OF THE INVENTION

In a skinning apparatus comprising a skinning roller driven to rotate and having a circumferential surface designed to grip the material to be treated, a pressure pad provided with a presser surface facing the circumferential surface of the skinning roller, being mounted displaceably relative to the circumferential surface of the skinning roller against the tension of a spring and including a knife receiving pocket, and a blade-like skinning knife received in said pocket, these objects are achieved in accordance with the present invention in that the knife blade is driven to oscillate and that the receiving pocket is designed as a guide slot guiding the knife blade.

The resulting advantages are in particular that the engagement possibilities of the oscillating surfaces of the knife on the fillet are decisively reduced. As a result of the rather small vibrating or oscillating mass, this concept makes it possible to increase the oscillating frequency and or the amplitude, which leads to a higher average cutting speed, which brings about a further reduction of the transverse forces stressing the fillet.

According to an advantageous development of the invention, adjustable stops are provided for adjusting the basic spacing between the presser surface from the circumferential surface of the skinning roller and/or for limiting the working clearance between these members. Thus, on the one hand, the basic position of the presser surface with respect to the circumferential surface of the skinning roller can be chosen entirely on the basis of the standpoint of reliable cutting and, on the other hand, the lifting movement of the pressure pad can be limited.

For bringing about a reliable guidance of the knife blade and for reducing the area of the knife back-surface coming into contact with the product being skinned, preferably the guide slot receiving the knife blade may, on the one hand, be formed by a back surface of the pressure pad and, on the other hand, by a cover, the latter being provided with at least one guide member which projects through the guide slot and into an elongated hole-like opening in the knife blade.

To permit a simple changing of the knife blade, it may be provided that in the region of its part projecting into the guide slot, each guide member may have chamfers on its sides facing in the oscillating direction and may be arranged to be displaceable against spring tension out of the region of the guide slot, whilst each opening may be aligned parallel to the cutting edge of the knife blade.

In view of the fact that the degree of stressing of the product being skinned is a function of the cutting pressure exerted by the knife blade, it is possible to reduce the same in that each opening is arranged at an inclination with respect to the knife blade cutting edge, so that the blade receives an additional oscillating component directed opposite to the product being skinned. A substantially transverse force-free driving of the knife blade can be obtained in that the drive producing the oscillating movement of the knife blade comprises a crank gear with two synchronously and oppositely moving crank disks, which carry crank pins each connected to a yoke by means of a crank driven rod, which yoke is arranged at one end of the knife blade.

For safeguarding a troublefree start and performance of the skinning process, the circumferential surface of the skinning roller may be provided with longitudinal grooves essentially extending along the generating lines of the circumferential surface.

BRIEF DESCRIPTION OF THE DRAWINGS

Other and further objects of the present invention will be apparent from the following description and claim and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a partial view of the complete apparatus in a simplified axonometric representation;

FIG. 2 shows a partial cross-section through the apparatus in the region of a knife blade guide member;

FIG. 3 shows a partial detail plan view of the inner surface of the cover guiding the knife blade in the region of a guide member;

FIG. 4 shows a partial detail plan view corresponding to FIG. 3 with an inclined guide member;

FIG. 5 shows a section along line V—V of FIG. 2.

DETAILED DESCRIPTION OF THE PREFERRED EMBODIMENT

A fish fillet skinning machine comprises a not shown frame, in which a discharge-side deflection roller 2 of an endless supply or feeding belt 1 as well as a skinning roller 3 are mounted, which rollers 2 and 3 are driven to rotate in the same rotational direction. The skinning roller 3 has a circumferential surface 4 provided with longitudinal grooves 5 in a known per se manner. In the region of its discharge side, the circumferential surface 4 of the skinning roller 3 is opposed by a pressure pad or shoe 6 defining a presser surface 7. The latter has a radius of curvature which corresponds essentially to that of the circumferential surface 4 of the skinning roller 3. The pressure pad 6 extends substantially over the entire length of the skinning roller 3 and can be displaced about an axis 8 away from the skinning roller 3 against the tension of a spring 9 and is supported in its basic position by means of an adjustable stop 10 with respect to the width of a clearance or gap between its presser surface 7 and the circumferential surface 4. A pivoting in the opposite direction is limited by a further stop 11. The pressure pad 6 is designed with a back surface 13 as its upward limitation, which back surface 13 extends parallel to the circumferential surface 4 of the skinning roller 3, while it forms an acute angle with the upper end region of the presser surface 7, the top edge 12 of said angle being blunted. The back surface 13 carries a cover 14 with a shoulder, which, together with the back surface 13, forms a guide slot 15 for guiding a knife blade 16. The surface part of the cover 14 which faces the skinning roller 3 is chamfered and, together with the top surface of the guide slot 15, forms a blunted edge 17, which opposes the top edge 12. The knife blade 16 is made from strip steel and its width is dimensioned in such a way that a cutting edge 18 formed thereon projects beyond the edge 17 and/or the top edge 12. In the region of both its ends, the knife blade 16 is provided with one longitudinally extending, elongated hole-like opening 19 each, which is engaged by a guide member 20. This guide member is guided in a corresponding recess 22 in the cover 14 and is held pressed against the back surface 13 of the pressure pad 6 via a pressure pin 24 by means of a leaf spring 23, whilst passing through the knife blade 16. The part of each guide member 20 projecting into the guide slot 15 has, on its sides facing in the oscillating direction, chamfers 21 having at least the thickness of the knife blade 16. One end thereof is secured to a yoke 25, which rests on a not shown sliding surface and is provided with two pins 26. Each one of these is engaged by one crank driven rod 27, respectively, of a double crank gear 28 formed by two synchronously and oppositely driven crank disks 29 carrying crank pins 30 driving said rods.

The function of the apparatus is as follows:

A fillet to be skinned lying on its skin side and with its tail end leading is placed on the circumferential surface 4 of the rotating skinning roller 3 by means of the feeding belt 1 and is conveyed on by the skinning roller. During its entering onto the skinning roller 3 the tail end engages in the longitudinal grooves 5 of the circumferential surface 4 and consequently enters underneath the cutting edge 18 of the knife blade 16. Shortly thereafter, it runs into the gap between the presser surface 7 and the circumferential surface 4 with the already detached parts of the skin, whereby a reliably conveying engagement occurs spontaneously on the cut-free skin. The pressure pad 6 is subject to a lifting force which, after overcoming the tension of the spring 9, effects that the presser surface 7 slides on the inner surface of the tough skin and, by entraining the knife blade 16, brings its cutting edge 18 into a distance from the circumferential surface 4 corresponding to the thickness of the skin to be severed.

In order to permit a more economical use of the knife blade 16, it can be designed as a reversible blade, in that both its longitudinal edges are provided with a cutting edge. For reversing and/or changing the knife blade 16, it is merely necessary to release the connection between the same and the yoke 25, whereupon the knife blade 16 may then be drawn out of the guide slot 15 in the direction of the crank gear 28 by displacing the guide members 20 via chamfers 21. Another knife blade 16 may be inserted correspondingly until the guide members 20 engage and/or lock in the openings 19 and may then be connected to the yoke 25.

What is claimed is:

1. A skinning apparatus comprising:
   a rotatable skinning roller;
   means in a surface of said skinning roller for gripping a muscular tissue;
   a pressure pad;
   said pressure pad including a presser surface having a shape generally conforming to said skinning roller;
   a guide slot in said pressure pad;
   a knife blade in said guide slot;
   said knife blade including at least one cutting edge thereon;
   said guide slot being positioned in said pressure pad to dispose said at least one cutting edge projecting therefrom and facing said muscular tissue;
   means for permitting resilient displacement of said pressure pad, said resilient displacement being also effective for resilient displacement of said knife blade;
   guide means for retaining said knife blade in said guide slot;
   said guide means further including means for permitting said blade to reciprocate in said guide slot; and means for transversely reciprocating said knife blade in said knife slot.

2. Apparatus according to claim 1, further comprising:
   adjustable stop means for adjusting a minimum spacing of said presser surface from said skinning roller;
   said adjustable stop means further includes means for controlling a maximum spacing of said presser surface from said skinning roller; and
   resilient means fur urging said presser surface toward said minimum spacing.

3. Apparatus according to claim 1, wherein:
   a cover is disposed on a back surface of said pressure pad;
   said cover, together with said back surface forming said guide slot;
   said guide means including an elongated slot in said knife blade; and
   said guide means further including at least one guide member projecting through said guide slot and into said elongated slot.

4. Apparatus according to claim 3, further comprising:
   adjustable stop means for adjusting a minimum spacing of said presser surface from said skinning roller;
   said adjustable stop means further includes means for controlling a maximum spacing of said presser surface from said skinning roller; and
   resilient means for urging said presser surface toward said minimum spacing.

5. Apparatus according to claim 3 wherein said guide member further includes chamfers on sides thereof facing in a direction of transverse reciprocation of said blade.

6. Apparatus according to claim 3 wherein said elongated slot is aligned parallel to said at least one cutting edge.

7. Apparatus according to claim 3 wherein said elongated slot is inclined with respect to said cutting edge.

8. Apparatus as claimed in claim 1, wherein:
   said means for reciprocating includes a crank gear having first and second crank disks;
   means for producing oppositely directed synchronized rotation of said first and second crank disks;
   a first crank pin in said first crank disk;
   a second crank pin in said second crank disk;
   a yoke connected to an end of said knife blade;
   means for connecting said first and second crank pins to said yoke; and
   said end of said knife blade extending beyond said guide slot.

9. Apparatus as claimed in claim 1, wherein:
   said means for gripping includes longitudinal grooves extending along generating lines of said surface.

10. Apparatus for removing skin from a fish comprising:
    a driven skinning roller;
    means on a surface of said skinning roller for gripping said skin;
    a pressure pad;
    a presser surface on said pressure pad facing a circumferential surface of said skinning roller;
    means for resiliently displacing said pressure pad relative to said skinning roller;

a back surface on said pressure pad;

a cover affixed to said back surface;

a guide slot formed in said back surface and said cover;

a skinning knife;

means for retaining said skinning knife in said guide slot with a cutting edge thereof projecting from said pressure pad for performing a severing;

at least one elongated slot-like opening in said skinning knife;

said means for retaining including at least one guide member projecting through said guide slot and into said elongated slot-like opening;

means for permitting said skinning knife to be reciprocated in said guide slot;

means for reciprocating said skinning knife in said guide slot;

means for reciprocating said skinning knife in said guide slot;

means for adjusting a basic spacing of said presser surface from said surface; and in the region of its part projecting into said guide slot, each guide member has chamfers on its sides facing in the direction of said knife means oscillation and is arranged to be resiliently displaceable out of the region of said guide slot.

11. Apparatus as claimed in claim 10, wherein each opening is aligned parallel to said cutting edge of said knife means.

12. Apparatus as claimed in claim 11 said means for reciprocating includes a crank gear including two synchronously and oppositely moving crank disks, one crank pin each arranged on each one of said disks and connected to a yoke by means of a crank driven rod, which yoke is affixed at one end of said skinning knife extending beyond said guide slot.

13. Apparatus as claimed in claim 11, wherein said surface of said skinning roller includes longitudinal grooves extending essentially along the generating lines of said surface.

14. Apparatus as claimed in claim 10, wherein each opening is arranged at an inclination with respect to said cutting edge of said knife means.

15. Apparatus as claimed in claim 14, wherein said surface of said skinning roller includes longitudinal grooves extending essentially along the generating lines of said surface.

16. Apparatus as claimed in claim 14 said means for reciprocating includes a crank gear including two synchronously and oppositely moving crank disks, one crank pin each arranged on each one of said disks and connected to a yoke by means of a crank driven rod, which yoke is affixed at one end of said skinning knife extending beyond said guide slot.

* * * * *